Aug. 12, 1952 W. J. PREISING ET AL 2,606,487
LOAD AND DEPTH GOVERNOR FOR PLOWS
Filed April 13, 1945 4 Sheets-Sheet 1

INVENTORS
Charles T. Ray
William J. Preising
BY Walter W. Burns
ATTORNEY

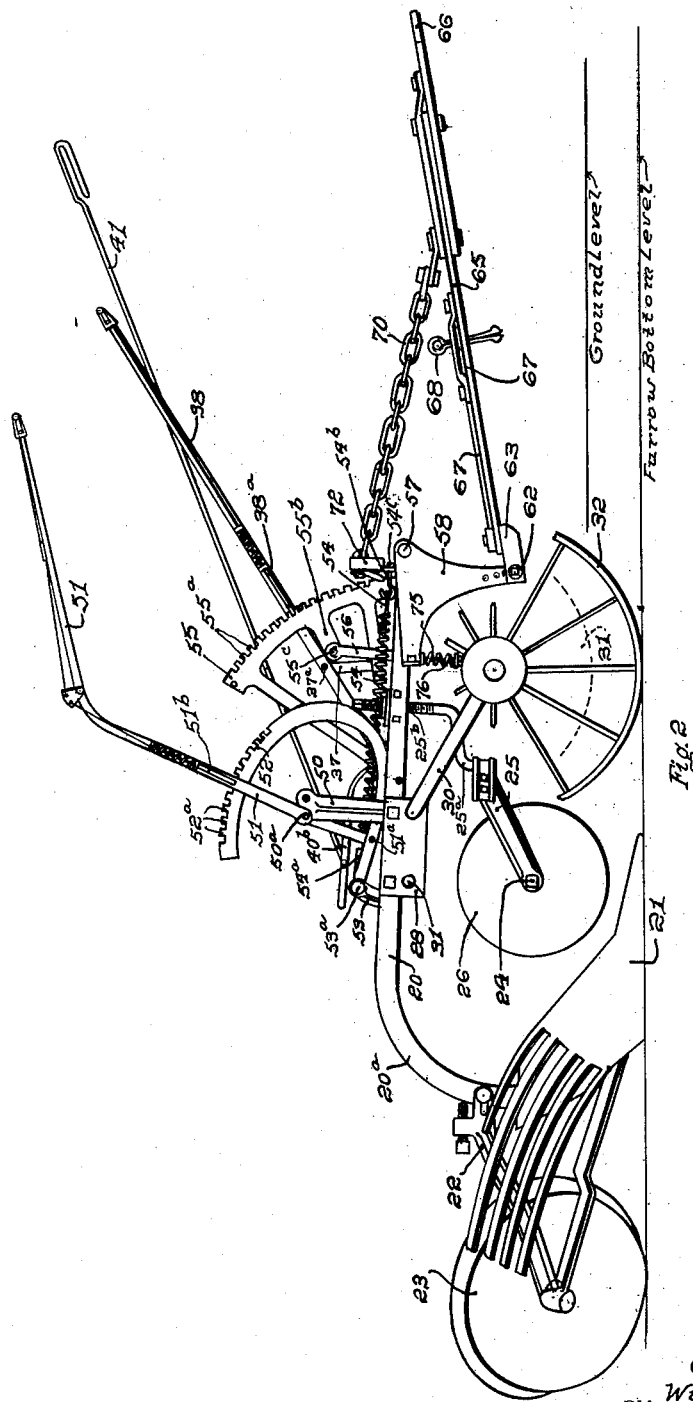

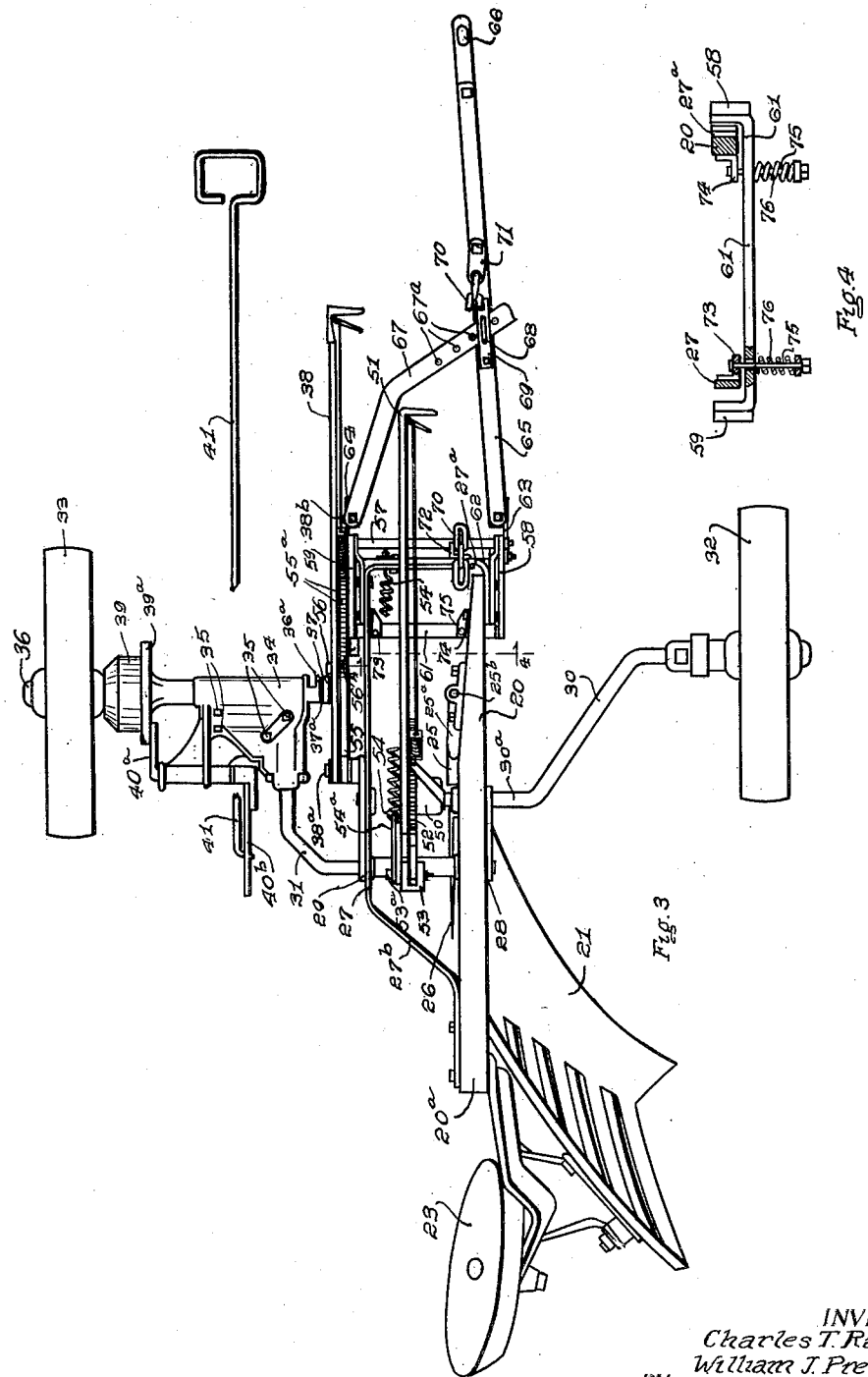

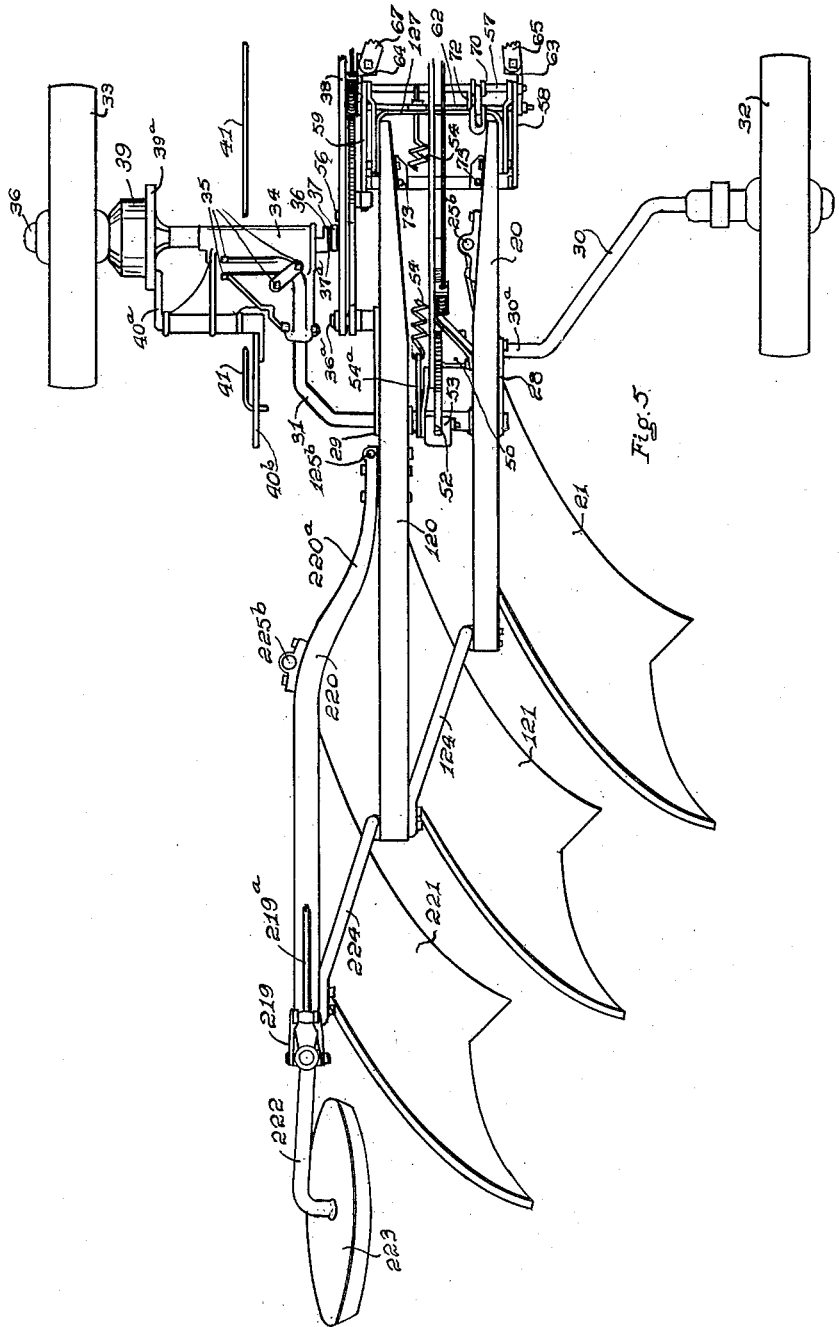

Patented Aug. 12, 1952

2,606,487

UNITED STATES PATENT OFFICE 2,606,487

LOAD AND DEPTH GOVERNOR FOR PLOWS

William J. Preising and Charles T. Ray, Louisville, Ky., assignors, by mesne assignments, to Minneapolis-Moline Company, a corporation of Minnesota Application April 13, 1945, Serial No. 588,110

4 Claims. (Cl. 97—75)

This invention relates to plows and has particular relation to the control of the depth to which the earth working elements will enter the ground, in relation to the load on the draft element and may be used with plows using either a tractor hitch or with double trees for animal traction.

The primary object of the invention is the provision of an improved draft control construction for wheel plows generally, wherein the pull in the draft element is kept substantially constant under varying soil conditions.

An important object of the invention is the provision of an improved draft and depth control for wheel plows wherein, when there is a tendency for the draft to increase or decrease, with for example; disc, disc gang, single or multiple mold board or middle burster plows, the depth will be controlled in a manner to immediately decrease or increase the plow penetration, as the case may be, thereby maintaining the draft substantially constant.

Another object of the invention is the provision of an improved draft and depth control for wheel plows, wherein mechanism is provided to tilt the plow point upwardly, or downwardly, whenever the pull on the draft element increases, or decreases, beyond a predetermined amount, as determined by the setting of the adjustable parts of the mechanism.

Another object of the invention is the provision of an improved draft and depth control mechanism for wheel plows wherein, when there is a tendency for the draft to increase, or decrease, with for example, plows having plow points, there will be an automatic and instantaneous tilting of the plow point upwardly, or downwardly, to anticipate the effects of actual increase or decrease in tractive effort on the power source, thus restoring the draft to normal prior to any substantial change taking place.

Another object of the invention is the provision of an improved draft and depth control mechanism for wheel plows wherein, when there is a tendency for the draft to increase, there will be yielding means to, at once, take up the increase load and automatically decrease the backward pull on the draft element by making the load lighter.

Another object of the invention is the provision of an improved draft and depth control mechanism for wheel plows wherein, when there is a tendency for the draft to increase with, for example, plows having plow points, there will be yielding means to, at once, take up the increase load and to automatically decrease the backward pull on the draft element by pointing the plow point toward the ground surface, thereby maintaining the load substantially constant.

Another object of the invention is the provision of an improved draft and depth control mechanism for wheel plows having plow points wherein, when the plow is in normal operation, a spring controlled depth-determining mechanism will take up sudden increases in draft and, at once, tilt the plow points to tend to bring them toward the ground surface to decrease the draft and to, at once, tilt the plow point downwardly when there is a sudden decrease in the draft, to increase the backward pull on the draft element, thereby maintaining a substantially constant pull on the draft element.

Another object of the invention is the provision of an improved draft control mechanism for wheel plows wherein, when there is a tendency for the draft to increase, or decrease, with plows other than of the middle burster or lister type, there will be an automatic and instantaneous tilting of the plow sidewise toward, or away from, the furrow side to anticipate an actual increase, or decrease in tractive effort of the power source, prior to its taking any substantial effect, thereby maintaining the draft substantially constant.

Another object of the invention is the provision of an improved draft control mechanism for wheel plows wherein, when there is a tendency for the draft to increase, or decrease, with plows other than of the middle burster or lister type, there is provided a resilient means to automatically and instantaneously tilt the plow point sidewise toward, or away from the furrow side to anticipate an actual increase, or decrease, in tractive effort of the power source, prior to its taking effect, thereby maintaining the draft substantially constant.

Another object of the invention is the provision of an improved draft and depth control mechanism for wheel plows wherein when there is a tendency for the draft to increase, or decrease, with plows other than disc plows, there will be an automatic and instantaneous tilting of the plow point upwardly, or downwardly and with the same mechanism with plows other than the middle burster or lister type, to tilt the plow sidewise toward, or away from, the furrow side to anticipate the actual increase, or decrease in the tractive effort of the power source, prior to its taking place, thereby maintaining the draft substantially constant.

Still another object of the invention is the provision of an improved draft and depth control for wheel plows wherein the forward end of the frame of a wheel plow will be raised when the draft increases beyond a predetermined maximum, thereby causing the plow to tend to decrease its depth of penetration, while either side can be adjusted independently of the other to provide for variation of penetration relative to the predetermined maximum draft or to provide for maintaining the plow in its proper position whether making the initial furrow or a successive furrow.

A still further object of the invention is the provision of an improved draft and depth control mechanism for wheel plows wherein, when the plow is in normal operation, there is a spring-controlled depth determining mechanism which will raise the plow when there is a tendency for the draft pull on the draft element to increase and will lower the plow when there is a tendency for the draft pull on the draft element to decrease.

Another and still further object of the invention is the provision of an improved draft and depth control mechanism for wheel plows wherein not only is any tendency to alter the draft pull at once compensated for to keep the pull on the draft element constant, but the resilient nature of the connections causes a distribution of the shock in such a manner as to reduce the stress at any point, thereby prolonging the life of the implement as a whole.

Another and still further object of the invention is the provision of an improved draft and depth control mechanism for wheel plows wherein is provided an adjustable resilient mechanism which may be adjustable to provide for various depths of penetration, numbers of plow bottoms to be used, weight or density of the soil to be worked and the pulling capacity or capacities of the animals or of the tractor or tractors to be used.

Another and still further object of the invention is the provision of an improved depth control for wheel plows wherein any sudden increase in the draft due to plowing conditions will not only at once tilt the plow point upwardly to decrease the draft, but will also tilt the plow sidewise to further reduce its resistance to forward movement.

Other and further objects of the invention will be apparent to those skilled in the art from a reading of the complete specification.

Referring to the drawing wherein is illustrated an embodiment of the invention:

Figure 2 is a view of the same structure taken from the right side.

Figure 3 is a plan view of the structure illustrated in Figures 1 and 2.

Figure 4 is a detail view taken on the line 4—4 of Figure 3.

Figure 5 is a plan view of the invention applied to a gang plow.

Similar reference characters refer to the same or similar parts throughout the specification and drawing.

Figure 1:
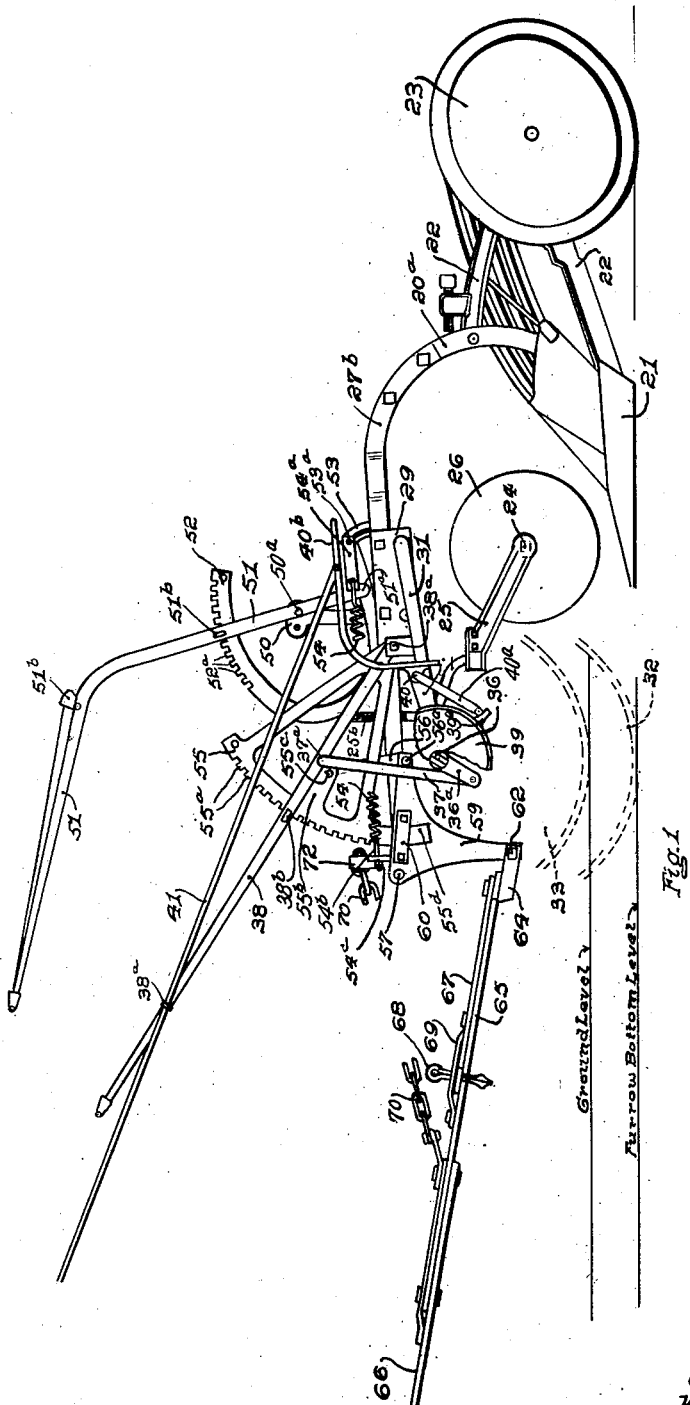
Figure 1 is a view of the left side of a single bottom wheel plow embodying the invention.

In the drawing the numeral 20 designates the beam of the plow which is also a part of the frame of the machine as a whole. At the rear portion on the lower end of the curved portion 20$^a$, is secured the plow 21 as illustrated, of the mold board type. Extending from the curved portion 20$^a$ is a bracket 22 upon which a rear furrow wheel 23 is pivotally mounted. This furrow wheel travels, when operating, in the furrow being made, as is well known in the art.

Pivoted by a horizontal pivot 24 on a swinging forked bracket 25 is the coulter wheel 26 which operates in a well known manner to assist in opening the furrow during the plowing operation.

The bracket 25 is swingingly mounted on an off-set arm 25$^a$ having an adjusting screw portion 25$^b$ which operates in a well known manner.

On one side of the beam 20 is secured, in a spaced relation, the frame member 27 which has a bent portion 27$^b$ and an end extension 27$^a$ which are suitably secured to the beam 20. On the outer sides of the beam 20 and the frame member 27 are plates 28 and 29. These plates extend from the tops of the parts 20, 27 downwardly a sufficient distance to provide for bearings for crank axles 30 and 31.

The crank axle 30 is mounted on the right side of the machine and is supported at its outer end by the right or forward furrow wheel 32 and the crank axle 31, which is on the left side of the plow, is supported at its outer end by the land wheel 33.

While the forward furrow wheel 32 is mounted directly on the crank axle 30, the actual end of the crank axle 31 is secured to a casting 34 by V-bolts 35 which pass below the crank axle end and hold it firmly against the casting 34. In the casting 34 is mounted the wheel axle 36 upon which is rotatably mounted the wheel 33.

The inner end of the axle 36 has an angular lifting crank end 36$^a$ which is connected to the lower end of the link 37. The upper end of the link 37 is pivoted at 37$^a$ to a hand adjusting lever 38 which is fulcrumed at 38$^a$ on the plate 29 which, in turn, is mounted on the frame member 27.

Adjacent the wheel 33 about the shaft 36 is a half-revolution clutch 39 having stop notches on its control plate 39$^a$. The details of the construction and operation of the half-revolution clutch are well-known in the art and will not here be set forth.

Also pivotally mounted in the casting 34 is a bell-crank lever 40 having a trip arm 40$^a$, one end of which engages successively the notches of the half-revolution clutch plate 39$^a$ and operates to release the clutch for its successive half-revolutions as is well-known in the art. The bell-crank lever 40 is provided with an operating arm 40$^b$ to which is attached an operating control rod 41 which extends forward to a position where it may be readily operated. A guide 38$^u$ on the hand lever 38, is provided to hold the forward end of the rod 41 at a convenient place to be reached by the operative.

All of the foregoing description is of structure which is not a part of the invention per se and is well known in the art. This structure with the constructions to be later described do, however, co-act and co-operate to produce the invention described and claimed herein.

The crank-axle 30 which supports the forward furrow wheel 32, and which has its inner end passing through the bearing plates 28 and 29, is provided with an upwardly extending arm 50 which is rigidly mounted thereon. An adjustable hand lever 51 is fulcrumed intermediate its ends at 50$^a$ to the upper end of the arm 50 and at its lower end is pivotally connected to one side of a loop-shaped rack bar 52 as at 51$^a$. The lower side of the rack bar 52 extends beyond the pivot 51ª and is pivotally connected at 53ª to an upwardly extending arm 53 which is rigidly mounted on the crank-axle 31 between the plates 28 and 29.

On the upper portion of the loop-shaped rack bar 52 are teeth 52ª. That portion of the rack bar 52 upon which are the teeth 52ª, is arcuate in shape about the pivot 51ª. A suitable latch mechanism 51ᵇ is provided to lock the lever 51 in adjusted relation to the bar 52.

At this point, it is desired to point out that since the upwardly extending arm 53 is held rigidly as will be later fully described, the movement of the hand lever 51 will rock the forward end of the arm 50 which will rotate the inner end of the crank axle 30 and raise or lower the wheel 32. As this movement of the hand lever 51 takes place, it is to be understood that the lower end pivot 51ª of the lever 51 moves about the pivot 53ª at the upper end of the arm 53, at which point the loop-shaped rack bar 52 is pivoted. During this movement, the pivot 50ª, which pivotally connects the arm 50 to the lever 51, moves about the inner end 30ª of the crank-axle 30, as a center. This movement of the crank-axle 30 by the hand lever 51, raises or lowers the furrow side of the plow frame without changing the position of the land side wheel relative to the frame or the plow. Attention is here invited to the fact that when the hand lever 51 is adjusted in any position, any forced movement of the land side crank-axle 31 and its wheel 33 will result in the rotation of the other crank-axle 30 in the same rotative direction with the result that both wheels will be raised or lowered together when the land side wheel is caused to be raised or lowered. This movement of both wheels is brought about by the fact that with the lever 51 locked to the loop-shaped rack bar 52 the effect is the same as though a link were connected at its ends to the points 50ª and 53ª located at the upper ends of the upwardly extending arms 50 and 53, respectively.

In order to counterbalance the weight of the frame, a spring 54 is provided and is connected to the pivot 53ª by a strap 54ª and to the forward portion of the frame, by an adjustable hook connection 54ᵇ through an upstanding bracket 54ᶜ.

When the land side wheel 33 is raised, or lowered, its movement is greater relative to the frame than the movement of the other wheel 32. This is desirable, for during the operation when the movement of the plow is under automatic control to maintain substantially constant draft, it is desired to not only tilt the plow point upwardly to decrease the draft, but also to tilt the plow toward the furrow side. This latter phase of the movement further assists in accomplishing the desired result as will be pointed out. This tilting of the frame, and plow, during raising and lowering of the frame, is caused by the ratio of the lengths of the off-sets in the crank-axles 30 and 31 and also in the relative lengths of the upwardly extending arms 50 and 53 of the respective crank axles 30 and 31. In the herein described structure, the off-set of the wheel axle 36 which is carried by the wheel 33 is greater than the off-set portion 30ª of the crank axle 30. In addition, the differential in movement may be accentuated by the fact that the upwardly extending lever arm 53 of the crank axle 31 can be made shorter than the upwardly extending arm 50 of the crank axle 30. It is believed to be clear from the foregoing that a forced lifting movement of the wheel 33 by its crank axle will cause a lesser movement of the wheel 32.

The mechanisms will now be described whereby the forced pivotal movement of the crank arm 31 may be brought about, either to place the plow parts in position for transport or to bring about automatic raising and lowering of the forward end of the frame and by so doing, tilt the plow point upwardly or downwardly and to thereby maintain a draft pull which will be substantially constant.

The upper end of the link 37, which at its lower end is connected to the lifting crank 36ª, is connected to the hand lever 38, at 37ª, as already described. The lower end of the lever 38 is fulcrumed at 38ª on the plate 29 which is rigid with the frame member 27. From this construction it is believed to be clear that with the half revolution clutch not in operation, any movement of the grip end of the hand lever 38 in a downward direction relative to the ground, will have the following effects: (1) lift the pivot 38ª and with it the left side 27 of the frame; (2) turn the crank axle 31; (3) push its upwardly extending arm 53 forwardly which in turn moves the loop-shaped rack bar 52, and the lower portion of the hand lever 51, will; (4) force the upwardly extending arm 50, of the crank axle 30 forwardly, thus rotating the latter to raise the right side of the frame; and since both sides of the frame are thus raised, the point of the plow will be raised.

And this lifting of both sides of the frame and the plow point will take place whether the movement of the hand lever 38 is accomplished by manual means or by the automatic feature to be presently described. It is to be borne in mind that during this adjustment just described the position of the rear furrow wheel 23 is not changed relative to the frame 20, 27. And in like manner, when the hand lever 38 is raised, both sides of the forward portion of the frame with the plow point, will be lowered.

The automatic feature of the raising and lowering of the frame will now be described.

The hand lever 38 is provided with a hand-controlled latch 38ᵇ, the construction of which is well known in the art. This latching device 38ᵇ coacts with the teeth 55ª of the rack frame 55 in a well known manner.

The rack frame 55 is pivoted to the frame member 27 at the pivot 38ª. Extending inwardly from the arcuate shaped section which carries the teeth 55ª, is a pivot supporting arm 55ᵇ. At the inward end of this supporting arm 55ᵇ is a pivot 55ᶜ to which a compression link 56 is pivoted.

The compression link 56 is connected at its bottom to one side of a double bell crank frame which, with its coacting parts, provides the automatic feature of the invention. In the modification disclosed, the bell crank comprises a pair of bell crank levers 58, 59 rigidly mounted on a pivot rod 57 which is pivotally mounted in suitable bearings at the forward end of the frame 20, 27. The bell crank 58 is mounted on the right side of the machine and the bell crank lever 59 on the left side. The bell crank lever 59 is provided with an extension at its rear upper portion to which the compression link 56 is pivoted at 56ª. Mounted on the side of the bell crank lever 59 is a spaced strap 60 between which and the lever 59, the extension 55ᵈ is guided and restrained from lateral displacement while still being permitted movement in a vertical plane.

A yoke 61 extends under the frame members 20, 27 and its turned-up ends are connected rigidly to the rearwardly extending portions of the bell crank levers 58 and 59, as in Figure 4. The lower ends of the bell crank levers 58 and 59 are rigidly connected together by a connecting spacer rod 62. The bell crank levers 58 and 59 with their connecting yoke 61 and the rods 57 and 62 constitute the double bell crank frame heretofore referred to.

Connected to the ends of the spacer rod 62 are two forwardly extending angle members 63, 64, which are freely pivoted on the rod 62, and bolted to pivot on the member 63 is a draft element 65 having a hitch eye 66. Bolted to a pivot on the member 64 is an adjustable bracing link 67 which is provided with adjustment openings 67a to provide for adjusting the link 67 relative to the draft element 65 to move the hitch eye 66 transversely relative to the frame of the implement. A securing pin 68 having a large eye is used to detachably hold the link 67 in place between the draft element 65 and the guide strap 69 secured thereto. A chain 70 is secured to the draft element 65 as by the eye member 71 and is detachably and adjustably secured to the upwardly extending member 72. A slot in the upper end of the member 72 provides the holding means for the chain 70. This chain 70 is used to hold the draft element off the ground when the implement is not in use; and, when the implement is in use, the chain is adjusted to be slack. This chain 70 may be so adjusted that when the implement is put in transport adjustment, the chain will tighten sufficiently to raise the rear wheel 23 off the ground.

Secured to the insides of the respective frame members 20 and 27 are a pair of angle irons 73 and 74. These angle irons are located above the connecting yoke 61 of the double bell-crank frame and each is provided with a bolt-hole which registers with a similar and corresponding hole therebelow in the transverse portion of the yoke 61. A bolt 75 passes through each hole in the angle irons 73 and 74 and its corresponding hole in the yoke 61. The heads of the bolts 75 rest on the upper faces of the angle irons 73 and 74 respectively. The bolts 75 are of sufficient length to pass through the coil springs 76, the springs being held in place by suitable washers and nuts at their lower ends. It will be apparent that the nuts can be adjusted to provide varying tension in the springs. This varying tension is used to adjust and control the force necessary to produce the automatic adjustment to maintain a substantially constant draft on the draft element. For larger plows or in using gang plows, a stronger spring is used.

The operation of the invention whereby a substantially constant draft is maintained on the draft element, will now be explained.

It is assumed that the hitch eye 66 is connected to a tractor with the wheel plow in transport position. As the field to be worked is approached, the operative pulls on the rod 41 which operates the bell crank lever 40 to cause the releasing arm 40a to trip the half revolution clutch 39. The clutch 39 operates to rotate the axle 36 with the arm 36a at the lower end of the link 37. This causes the hand lever 38 to be raised to a relatively high position which permits the plow point to enter the ground.

Continued forward movement of the plow permits the furrow wheel 23 to guide the rear end of the plow into a furrow. Upon reaching the bottom of the furrow and with conditions normal, the plow bottom levels off and a furrow of substantially uniform depth results, the furrow wheel running at the bottom of the furrow.

The tension of the draft on the draft element pulls forward on the lower end of the bell-cranks 58, 59. This causes the bell-cranks to swing and their rear extensions to move downwardly. But since the transverse or cross portion of the yoke 61, forming a portion of the bell-crank frame is above the springs 76 and the heads of the bolts 75 are held from downward movement against the angle pieces 73, 74, attached to the frame parts 27, 20, respectively, the downward movement of the yoke 61 will compress the springs 76.

With the compression of the springs 76, the downward movement of the yoke 61 and the left hand bell crank 59, pulls downwardly on the link 56. This, in turn, swings the rack frame 55, to which it is pivotally connected at 55c, downwardly and forwardly. This action in turn causes the rack 55 to which the lever 39 is secured by the latch device 38b, to force the link 37 downwardly to tend to swing the crank axle 31 in a forwardly and downwardly direction relative to the frame 20, 27.

Since, as already described, we have seen that swinging the crank axle 31 in the manner described, also swings the other crank axle 30 in the same direction relative to the frame 20, 27, it is believed obvious that the frame 20, 27 will be lifted.

After travel of a short distance, with soil conditions normal, the plow bottom will make a furrow of uniform depth. By tightening the nuts of the bolts 75 against the springs 76, the compression on the springs 76 is increased and the yoke 61 raised. Conversely the backing off of the nuts on the bolts 75 will lessen the tension on the springs 76 and permit the yoke 61 to be lowered, the other conditions remaining the same.

The strength and adjustment of the springs 76 should be such that the moving parts will have a floating action and the springs 76 will be neither compressed nor expanded to their limits of movement.

In this condition with all parts in a state of balance, with a draft pull on the draft element 65 and the springs 76 under partial compression, it is believed obvious that should the soil encountered become suddenly of an increased density or for any other reason be such that the back pull of the wheel plow should increase the draft on the draft element, the rear portions of the bell cranks 58 and 59 will be pulled downwardly. But as just explained, this action causes a co-action between the parts to raise the front end of the frame 20, 27 and the point of the plow 21. This points the plow point toward the surface of the ground which, obviously, lessens the draft pull on the draft element 65.

And since the relative lengths of the crank axles 30 and 31 and their respective upwardly extending arms 50 and 53 are such that the upward movement of the left side of the implement frame is faster than that of the right side, such upward movement causes a sidewise tilting toward the right side. This tilting has a further tendency to lessen the draft, due to the fact that the plow is tilted away from the land side and consequently takes away less soil as it moves.

From the above description it is clear that any sudden increase in the draft due to soil conditions will be immediately met with a decrease in the draft and thereby neutralize the increase. And since the tendency to increase the draft is immediately met with a neutralization in a like amount, the draft is maintained substantially constant.

As soon as the conditions return to normal, and the abnormal increase in draft discontinues, the parts return, by the release of the increased compression in the springs 76, to the positions held at the time of the temporary draft increase.

Let us now assume a sudden decrease in the draft due, for example, to the encountering of a stretch of light soil.

Since, during the forward travel of the implement while in operation, the draft is always against the compression of the springs 76, any sudden tendency for the back pull of the plow to decrease is at once evident in the reaction of the springs 76 to expand. When this expansion takes place, the rear extension of the left hand bell-crank lever 59 at once swings upwardly causing the rack frame 55, through its connection to the link 56, to be swung upwardly and rearwardly about its pivot 38ª. This movement permits the link 37 to be raised relative to the frame 20, 27 with the result that the frame 20, 27 will lower relative to the wheel axle 36 and its wheel 33. This, as has been described, rotates the crank-axle 36 to swing its upwardly extending arm 53 rearwardly, and through the loop-shaped rack bar 52, and the hand-lever 51, the upwardly extending arm 50 is also swung to the rear. This movement of the arm 50 rotates the crank-axle 30, to which it is attached, in the same direction as the crank axle 31. This action, as has been described, at once lowers the front end of the frame and with it the plow point. As the plow point is lowered, it obviously goes deeper into the soil with a corresponding increase in back draft pull on the frame and imposes more draft on the draft element 65. This increase in the draft at once reverses the movement of the parts toward their previous normal positions. As normal soil conditions return, all parts return to the settings for the predetermined depth of soil penetration. By setting the nuts of the bolts 75, thus controlling the compression of the springs 76, a setting may be made to maintain a predetermined load for the source of power producing the forward motion.

Referring now to Figure 5, wherein is illustrated a three furrow plow, it is to be noted that most of the parts illustrated and described in connection with Figures 1 to 4, have their counter parts in Figure 5 and are correspondingly designated. There are, however, some parts which are different in construction, and these will now be described.

In place of the frame member 27 and its offset portion 27ᵇ, there is provided in the construction of Figure 5, a plow beam 120, which is longer than the beam 20, which forms a part of the main frame in the construction of Figures 1 to 4, as well as in the construction of Figure 5. The forward ends of the beams 20 and 120 are connected together with a U-shaped member 127, the latter being secured to the forward ends of the beams 20 and 120 by suitable bolts. The rear ends are provided with a spacing bar 124 whose ends are securely bolted to the respective rear curved portions of the beams 20 and 120 as illustrated in Figure 5.

The beam 120 carries the plow 121 which is mounted in a position to the rear of and offset from the plow 21.

Rearwardly of and in echelon relation to the plow 121 is a third plow 221 which is carried by the plow beam 220. The forward portion 220ª of the plow beam 220 is offset in a manner to enable it to be secured to the mid-portion of the plow beam 120. A suitable spacer bar 224 is suitably bolted at its ends to the rear curved portions of the plow beams 120 and 220.

At the rear of the beam 220 is secured a support member 222 to which is secured a rear furrow wheel 223. The support member 222 is provided with a lifting lever device 219 for lifting the furrow wheel 223 by means of the rod 219ª, in a manner well known in the art. The lifting lever device which is used to raise the rear end of the frame and the plows is operated when it is desired to place the plow in transport position. Since the details of the lifting device are well known in the art and are not a part of the invention per se, it will not be described further.

When it is desired to modify the plow to make a two furrow plow, the plow beam 220 is removed, the lifting device 219 with the support member 222 is removed from the beam 220 and attached in a similar manner to the rear of the beam 120.

Height adjusting screws 125ᵇ and 225ᵇ are provided for the respective plows 121, 221 and are similar to the screw 25ᵇ and for a similar purpose. It is to be understood that when more than one earth-working member is used, a stronger spring 76 is used.

While we have illustrated an embodiment of the invention as applied to two different plow types, it is to be understood that the term plow is used broadly to any earth-working implement to which the invention might be applied and that modifications and changes may be made without departing from the spirit of the invention and within its scope as claimed.

Having described the invention, what is claimed is:

1. A plow having a frame, a pair of supporting wheels, means connecting the wheels to the frame to hold the wheels in supporting relation in various positions of height adjustment relative to the frame, a draft element, a draft control lever fulcrumed on the frame and having a pivoted connection to the draft element, a spring mounted on the frame in position to oppose the pull of the draft element, a segmental member pivoted on the frame and carrying a rack, a link connecting the segmental member to the control lever, a hand lever pivoted on the frame and having a locking mechanism in position to engage the teeth of the rack to adjustably secure the hand lever in adjusted position relative to the rack and a connection between the hand lever and the wheel connecting means to vary the height of the wheel as the draft element pulls on the control lever.

2. A plow having a frame, a pair of supporting wheels, means connecting the wheels to the frame to hold the wheels in supporting relation in various positions of height adjustment relative to the frame, a draft element, a draft control lever fulcrumed on the frame and having a pivoted connection to the draft element, a spring mounted on the frame in position to oppose the pull of the draft element, a segmental member pivoted on the frame and carrying a rack, a link connecting the segmental member to the control lever, a hand lever pivoted on the frame and having a locking mechanism in position to engage the teeth of the rack to adjustably secure the hand lever in adjusted position relative to the rack, a connection between the hand lever and the wheel connecting means to vary the height of the wheel as the draft element pulls on the control lever and means for locking the wheels together for simultaneous movement at varying heights.

3. A plow having a frame, a pair of supporting wheels, means for separately connecting the wheels to the frame, a soil working member having a point and connected to the frame, a draft element, a bell crank lever fulcrumed on the frame and having one arm connected to the draft element, springs mounted on the frame in position to oppose the pull of the draft element, a pivoted segmental member connected to the bell crank lever, a hand lever fulcrumed on the frame, having an operative connection to one of the wheel connecting means and having an adjustable connection to the segmental member, and a height adjusting mechanism between the wheel connecting means to cause the wheels to be moved as to height and in unison relative to the frame.

4. A plow having a frame, a pair of supporting wheels, means for separately connecting the wheels to the frame and guiding the wheels in supporting relation in various positions of height relative to the frame, a draft element, a bell crank lever fulcrumed on the frame and having one arm connected to the draft element, springs mounted on the frame in position to oppose the pull of the draft element, a segmental member pivoted on the frame and carrying a rack, a link connecting the segmental member to the bell crank lever, a hand lever pivoted on the frame and having a locking mechanism in position to engage the teeth of the rack to adjustably secure the hand lever in adjusted position relative to the rack, a connection between the hand lever and the wheel connecting means to vary the height of the wheel as the draft element pulls on the bell crank lever.

WILLIAM J. PREISING.
CHARLES T. RAY.

REFERENCES CITED

The following references are of record in the file of this patent:

UNITED STATES PATENTS

| Number | Name | Date |
| --- | --- | --- |
| 755,614 | Casaday | Mar. 29, 1904 |
| 900,922 | Evans | Oct. 13, 1908 |
| 1,273,069 | Keckritz | July 16, 1918 |
| 1,394,767 | Smith | Oct. 25, 1921 |
| 1,440,924 | Lindgren | Jan. 2, 1923 |
| 1,463,379 | Strandlund | July 31, 1923 |
| 1,708,633 | Ray | Apr. 9, 1929 |
| 1,926,401 | Paul | Sept. 12, 1933 |
| 1,947,640 | Brodersen | Feb. 20, 1934 |
| 2,357,847 | Ray | Sept. 12, 1944 |
| 2,358,281 | Ray | Sept. 12, 1944 |